United States Patent [19]
Khan et al.

[11] Patent Number: 5,997,179
[45] Date of Patent: Dec. 7, 1999

[54] MULTIFLUID APPLICATION IN HYDRODYNAMIC FLUID BEARING TO REDUCE EVAPORATION AND CONTROL STIFFNESS AND OTHER BEARING PERFORMANCE

[75] Inventors: Raquib Uddin Khan, Pleasanton; Gunter Karl Heine, Aptos; Mohamed Mizanur Rahman, San Jose, all of Calif.

[73] Assignee: Seagate Technology, Inc., Scotts Valley, Calif.

[21] Appl. No.: 09/064,804

[22] Filed: Apr. 22, 1998

[51] Int. Cl.[6] .................................................. F16C 17/10
[52] U.S. Cl. ........................................... 384/107; 384/112
[58] Field of Search .................................. 384/107, 112, 384/115, 113, 119

[56] References Cited

U.S. PATENT DOCUMENTS 4,938,611  7/1990  Nii et al. .................................. 384/107
4,967,831  11/1990  Leland ....................................... 384/12

Primary Examiner—Lenard A. Footland
Attorney, Agent, or Firm—Flehr Hohbach Test Albritton & Herbert LLP

[57] ABSTRACT

The hydrodynamic bearing gap from one end to the other of the shaft and sleeve combination is effectively separated into sections, with the fluid in each bearing section being contained within that section. The viscosity of the fluid in each bearing section can then be selected to optimize the characteristics of the entire hydrodynamic bearing. Typically, the sections of the bearing adjacent each open end of the bearing would be filled with a fluid with relatively high viscosity. The remaining sections, toward the center of bearing, would typically be filled with a lower viscosity fluid, liquid or gas so that the power consumption within the motor itself would be minimized.

8 Claims, 4 Drawing Sheets

MULTIFLUID APPLICATION IN HYDRODYNAMIC FLUID BEARING TO REDUCE EVAPORATION AND CONTROL STIFFNESS AND OTHER BEARING PERFORMANCE

CROSS REFERENCE TO RELATED APPLICATION

This application is useful in U.S. patent application, Ser. No. 09/043,065, filed Dec. 19, 1997 entitled "BOTH ENDS OPEN FLUID DYNAMIC BEARING WITH MULTIPLE THRUST PLATES" by Khan, et al. (Attorney Docket No. A-65138/JAS); and U.S. patent application Ser. No. 08/981,548, filed Dec. 19, 1997 entitled "BOTH ENDS OPEN FLUID DYNAMIC BEARING HAVING A JOURNAL IN COMBINATION WITH A CONICAL BEARING" by Rahman, et al. (Attorney Docket No. A-65139/JAS); all of which are assigned to the assignee of this invention and are incorporated herein by reference.

FIELD OF THE INVENTION

The present invention relates to magnetic disc drive storage systems, and more specifically, the present invention relates to a hydrodynamic fluid bearing for use in a magnetic disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. The transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids.

Hydrodynamic bearings spread the bearing interface over a large surface area in comparison with a ball bearing assembly which comprises a series of point interfaces. This is desirable because the increased bearing surface reduces wobble or run-out between the rotating and fixed members. Moreover, the use of fluid in the interface area imparts damping effects to the bearing which helps to reduce non-repeatable runout.

However, hydrodynamic bearings themselves suffer from disadvantages, including a low stiffness-to-power ratio. These problems lead to a high sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

In order to have top cover attachment, the motor bearing would need to be open on both ends. Opening a hydrodynamic bearing type motor bearing at both ends greatly increases the risk of oil or fluid leakage out of the hydrodynamic bearing. This leakage is caused among other things by small differences in flow rate created by differing pumping pressures in the bearing. If all of the pressure gradients within the bearing are not carefully balanced, a net pressure rise toward one or both ends will force the fluid out through the capillary seal, thus creating a huge fluid wetted surface.

Another problem which follows from leaving the hydrodynamic bearing open at both ends is that more of the bearing is exposed to the atmosphere, increasing the possibility of evaporation of the fluid over the long term. Such a fluid loss would have a serious effect on the stiffness of the bearing as well as overall reliability of the drive.

A related problem is that it is desirable, in terms of the stiffness of the bearing and minimization of evaporation, to use a higher viscosity fluid. However, such higher viscosity fluids can create a drag effect which increases the power required for the motor.

Thus, the need exists for a new approach to the specification of hydrodynamic bearing fluids to optimize the motor performance and stiffness while diminishing evaporation.

SUMMARY OF THE INVENTION

Thus, it is an object of the present invention to create an improved hydrodynamic bearing which is optimized for stiffness and power consumption by the choice of hydrodynamic fluids, while diminishing the potential problem with evaporation. As used throughout this application, fluid may be either gas or liquid.

This and other objectives of the invention are addressed by providing a hydrodynamic bearing useful as a bearing cartridge or the like and especially useful in a disc drive spindle motor or a similar system, where the entire bearing gap from one end to the other of the shaft and sleeve combination is effectively separated into sections, with the fluid in each bearing section being contained within that section. The viscosity of the fluid in each bearing section can then be selected to optimize the characteristics of the entire hydrodynamic bearing. Typically, the sections of the bearing adjacent each open end of the bearing would be filled with a fluid with relatively high viscosity. Such a fluid would maintain the stiffness of the bearing at the ends of the shaft, minimizing tilt, wobble and the like. Further, such fluid would be less likely to evaporate. This is significant because due to dimensional tolerances, the gap along the shaft is more vulnerable to evaporation than the gap between thrust plate and counterplate. The latter gap usually contains more fluid.

The remaining sections, toward the center of bearing, would typically be filled with a lower viscosity fluid, liquid or gas so that the power consumption within the motor itself would be minimized.

Other features and advantages of the present invention may be apparent to a person of skill in the art who study the following description of exemplary preferred embodiments given with reference to the following figures.

DETAILED DESCRIPTION OF A PREFERRED EMBODIMENT

Figure 1:
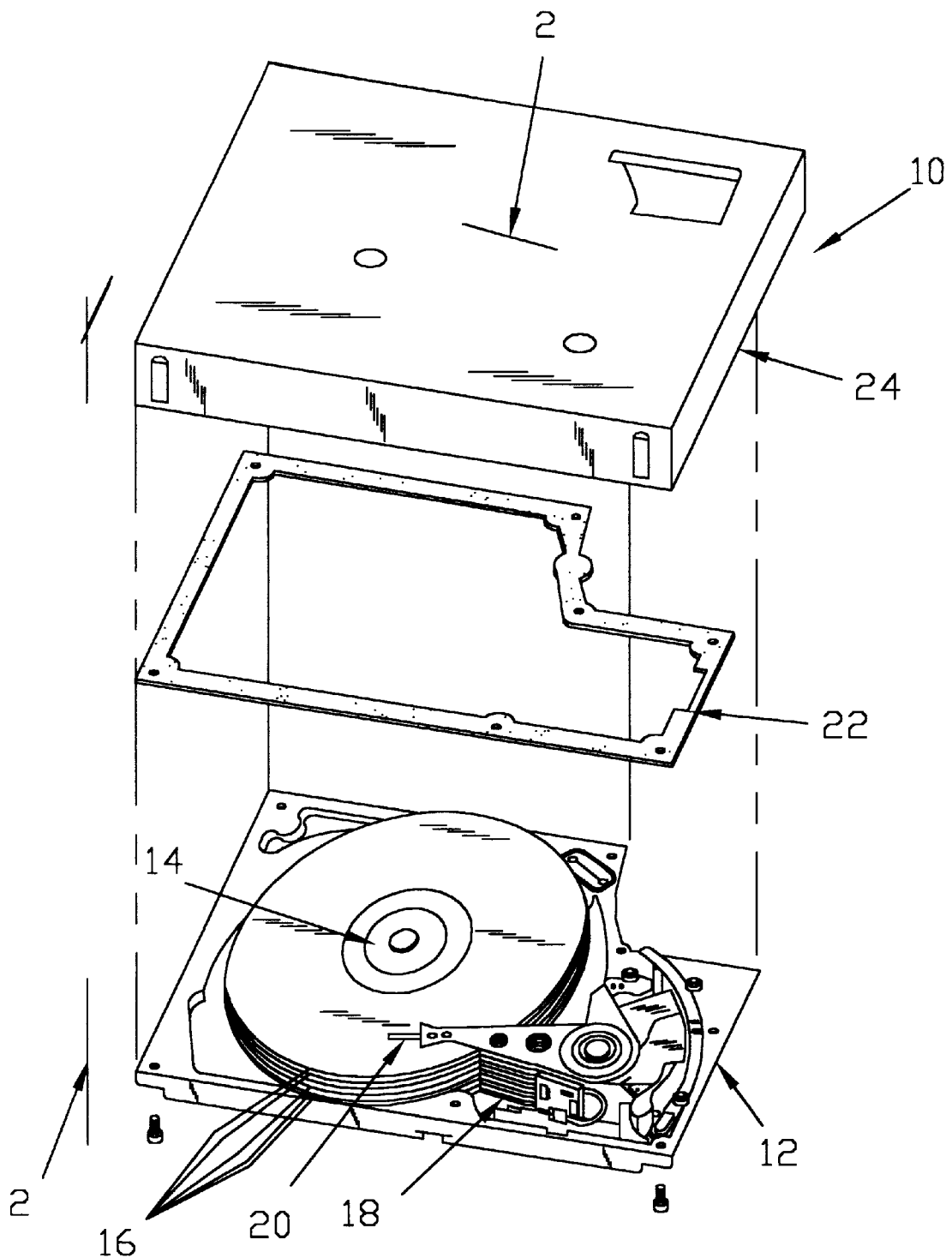
FIG. 1 is a perspective view of a magnetic disc storage system of a type which incorporates a hydrodynamic bearing cartridge and spindle motor in accordance with the present invention.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the many advantages which this invention achieves, it could also potentially be used to support the actuator for rotation. The bearing cartridge also has numerous other uses outside of the field of disc drives.

Further, the fluid bearing disclosed herein has a fixed shaft and rotating, surrounding sleeve. The design is also useful where the sleeve is fixed and the shaft rotates. Since the bearing is open at both ends, the shaft could extend beyond the sleeve, and be axially coupled to an external device or system.

In this particular example, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microinches; thus it is absolutely essential that the disc does not tilt or wobble.

Figure 2:
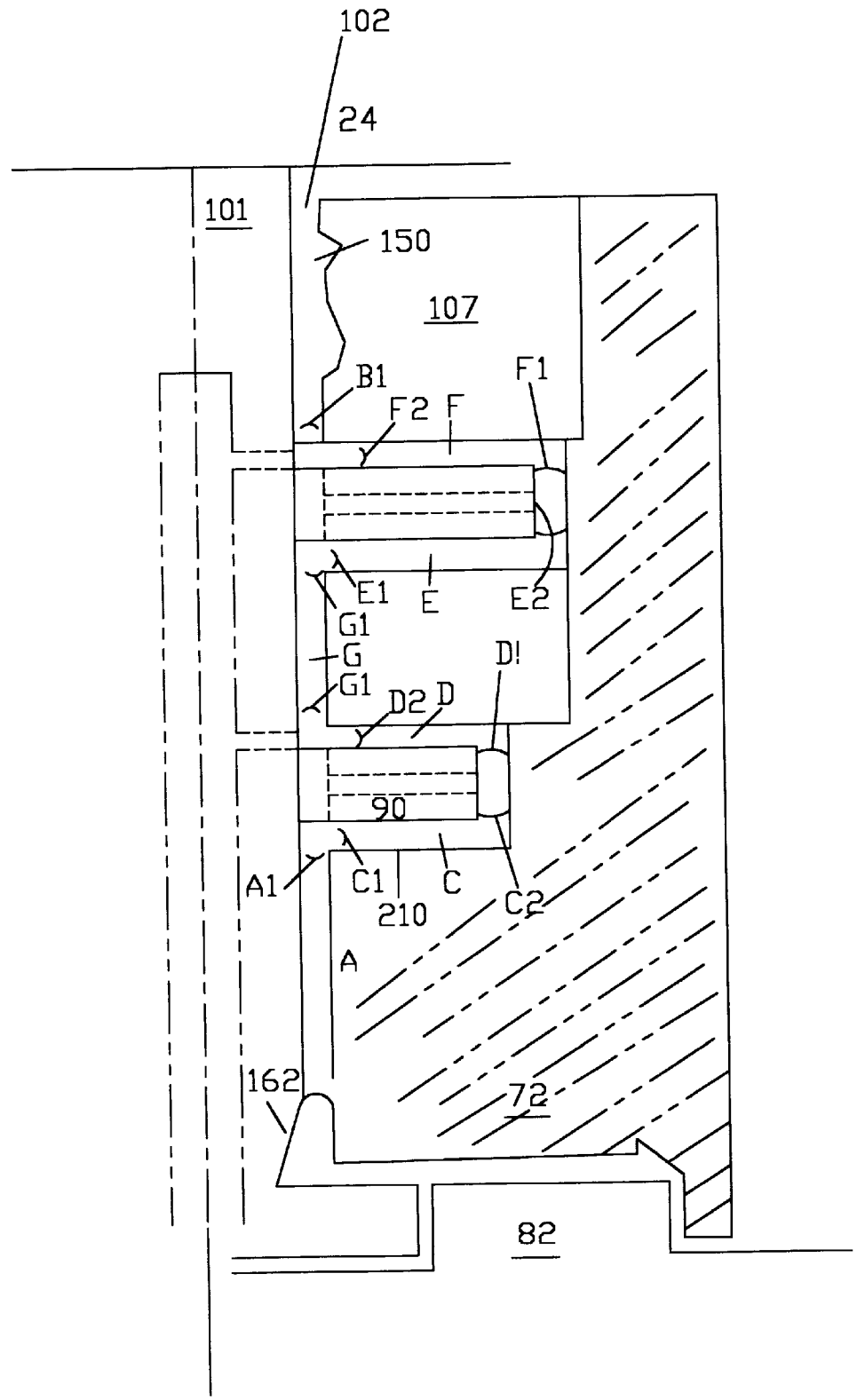
FIGS. 2 and 3 are vertical sectional views of a hydrodynamic bearing cartridge in which the present invention would be useful.
Figure 3:
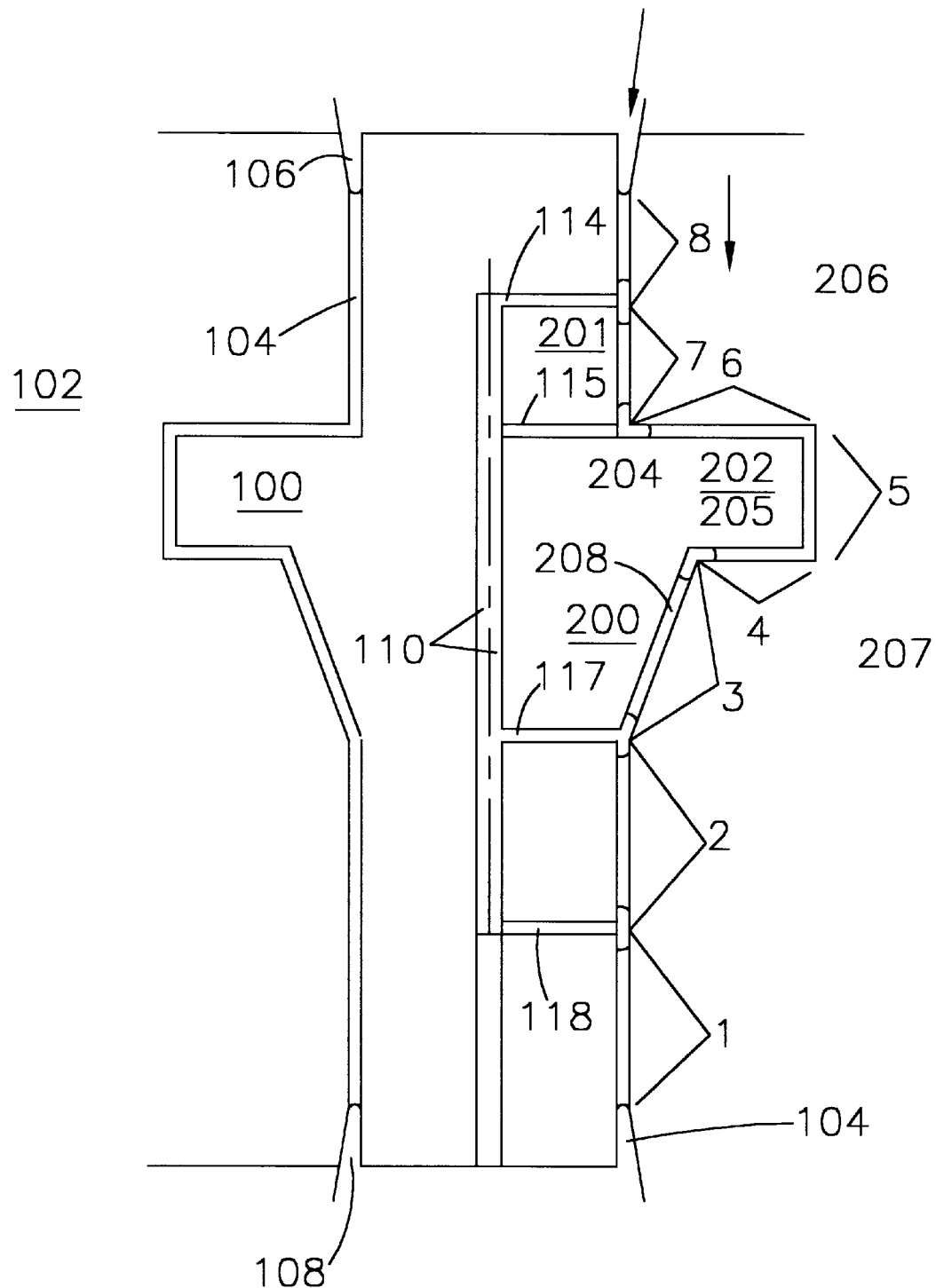

FIGS. 2 and 3 are vertical sectional views of a hydrodynamic bearing motor design of a type which is disclosed in the referenced applications.

An embodiment is shown in FIG. 2 which is also explained in detail in one of the incorporated applications. This design includes a shaft 101 cooperating with a sleeve 72 and associated counter-plates 105, 107 to define a hydrodynamic bearing gap 102. The gap is divided into a plurality of bearing sections A–F surrounding the shaft and the thrust plates 90–92. In this design, consistent with the teachings of the present invention, it would be desirable to use the higher viscosity fluid in the bearing sections A, B which are the journal bearings of the present system. As in FIG. 2, these are the bearing sections where it is most important to have higher viscosity fluid to minimize evaporation and maintain the stiffness of the system.

Further, consistent with this invention, a lower viscosity fluid or even gas would be used in the bearing sections C, D, E, F and G which are the interior journal bearing G and the thrust bearings C, D, E and F. Each of these is isolated from the adjacent bearing as shown and may be separately filled. Thus, by use of the low viscosity fluid or gas in these interior sections, again the power consumption of the system, considered as a whole is minimized.

FIG. 3, for example, shows a hydrodynamic bearing system comprising a plurality of bearing sections 1–8. Sections 1, 2, 7 and 8 are journal bearings which are defined between the axial walls of the shaft 100 and the sleeve 102. Bearing section 3 is a conical bearing defined between the inclined wall section 208 of the shaft 100 and the facing wall section 210 of the sleeve 102. Sections 4 and 6 are thrust bearings defined between the radial wall sections 204, 205 of the shaft and the complementary wall sections 206, 207 of the sleeve. As can be seen, a meniscus is formed at either end of each of the sections (except the sections 4, 5 and 6, although these could also be divided into bearing sections) so that the fluid in each bearing section is isolated. Taking advantage of this, according to the present invention, fluids of different viscosity could be placed in each of these sections. For example, in a preferred approach, a fluid of higher viscosity such as 80 CP could be filled in gap bearing sections 1,8. Such a relatively higher viscosity fluid is relatively less likely to evaporate, making it an excellent choice for the fluid which is adjacent the capillary seals 106,108 which have the greatest exposure to the surrounding atmosphere and therefore the highest likelihood of evaporation. Further, such a higher viscosity fluid will lend greater stiffness to the ends of the shaft relative to the sleeve, minimizing the likelihood of tilting of the shaft. Typically, the remaining sections, 2–7 which can be separately filled would be filled with fluids of lower viscosity such as 10 CP or even a gas. This would limit the power consumed in rotating the motor, especially in the thrust and conical bearing regions.

Obviously, depending on the load requirements and the orientation of the bearing, it may become desirable to use a relatively higher viscosity fluid also in an interior bearing section such as in the section 3, the conical bearing, or in the sections 4–6 which may be the primary load bearing sections in certain environments.

Figure 4:
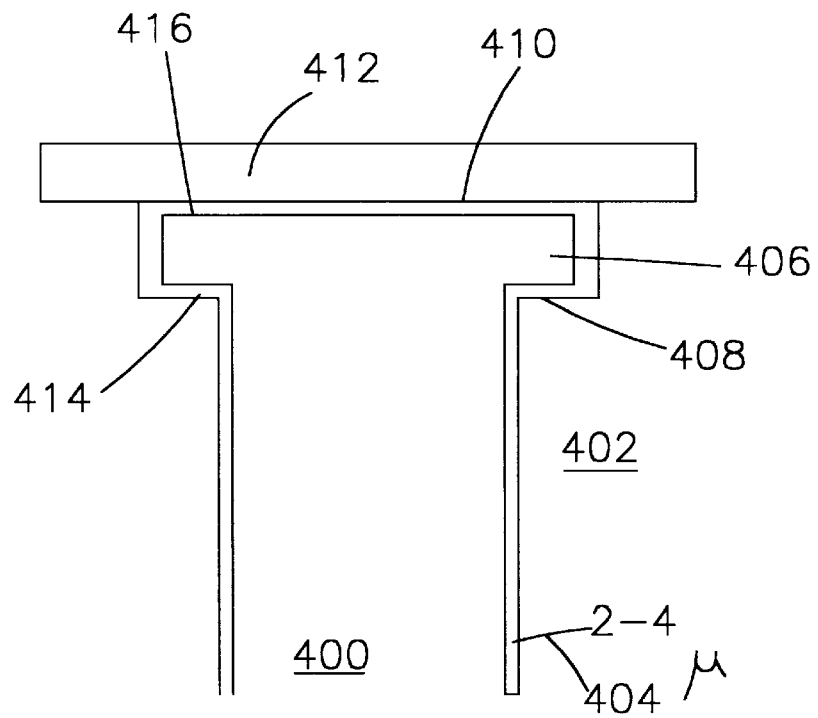
FIG. 4 is a vertical sectional view of a rotating shaft design with small thrust plate.
Figure 5:
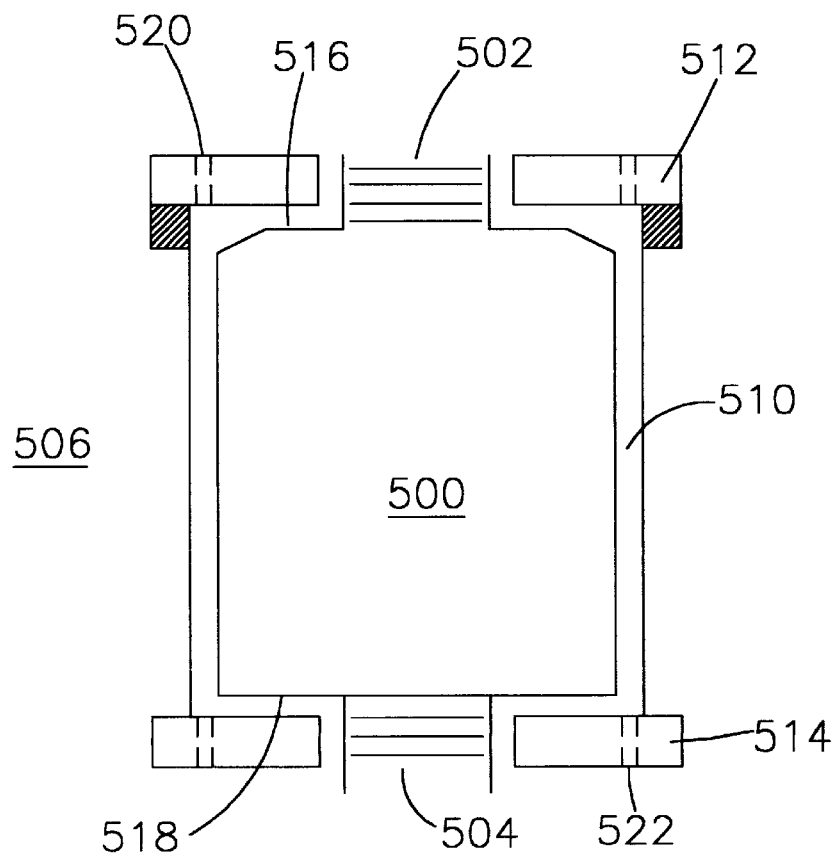
FIG. 5 is a vertical sectional view of a fixed shaft design using this invention.

Two further, substantially simplified designs appear in FIGS. 4 and 5. FIG. 4 shows a very simple form of single plate hydrodynamic bearing in which the liquid and gas combination is especially useful. In this embodiment, which incorporates a relatively large diameter shaft 400 surrounded by a sleeve 402, the journal bearing which would typically be an air bearing would have a gap of about 2–4 μm. This gap is relatively narrow compared to the gap for the liquid bearing, which gap is defined between the thrust plate 406 and a radial wall 408 of the sleeve on one side and a surface 410 of counterplate 412 on the other side. This gap 414, 416 has a spacing of 7–8 μm; it is 2 to 4 times wider than the air or gas bearing gap 404. The advantages reside in the fact that the thrust bearing is smaller in size because of the relatively narrow radial extent of the gap 414; thus even though a higher viscosity fluid such as a liquid is used in the gap, the power consumption which is relatively larger than in the gap 404 per unit area will in the overall sense of the complete shaft bearing support system be relatively small. In contrast the journal bearing defined in the gap 404 is filled with gas or air and consumes a relatively small amount of power. In summary, utilizing such a design, the radial stiffness remains high because of the relatively large shaft and the relatively small gap for the journal bearing 404. The axial stiffness comes from the thrust bearing which is smaller in size, has larger clearances, and has very small power consumption.

A further alternative appears in FIG. 5 which also has a shaft 500 of a relatively large diameter. In the case shown in FIG. 5, the shaft is fixed at both ends by attachment extensions 502, 504. The sleeve 506 rotates around the shaft 500 and defines in part a journal bearing 510 which may have a gap of about 2–4 $\mu$m and is typically filled with gas or air. A thrust plate 512, 514 is mounted at each end of the sleeve and defines a gap 516, 518 with a radial surface of the shaft 500. This gap would typically be 6–8 $\mu$m; and the gap 516, 518 can be filled in either instance or in both instances with liquid, with the fluid being placed in one or both gaps to be optimized for power consumption. It should be noted that in this embodiment a groove 520, 522 can be incorporated in each of the thrust plates 512, 514 respectively to enforce a separation boundary between the liquid which fills the thrust bearing and the gas which fills the journal bearing 510.

Other alternatives to the present invention may become apparent to a person of skill in the art who studies the present invention disclosure. Therefore, the scope of the present invention is to be limited only by the following claims.

What is claimed is:

1. A hydrodynamic bearing comprising a shaft, a sleeve surrounding said shaft, a gap between said shaft and said sleeve allowing for relative rotation of said shaft and said sleeve, said gap being effectively divided into a plurality of sections, each of said sections being filled with a fluid to support said relative rotation of said shaft and said sleeve, the bearing sections at the upper and lower ends of said shaft and said sleeve or some other chosen bearing section being filled with a fluid of higher viscosity than the fluid filling the remaining bearing sections, so that the evaporation of said bearing fluid is minimized.

2. A hydrodynamic bearing as claimed in claim 1 wherein the fluid in each section is a liquid or gas, with the fluid confined to each bearing on said bearing section being a liquid or gas to optimize the power consumption of the total bearing.

3. A hydrodynamic bearing as claimed in claim 2 further including at least one conical bearing located between said upper and lower journal bearings, said conical bearing being filled with a fluid of relatively lower viscosity.

4. A hydrodynamic bearing as claimed in claim 2 further including a thrust bearing located between said upper and lower journal bearings and filled with a fluid of relatively lower viscosity than said upper and lower journal bearings.

5. A hydrodynamic bearing as claimed in claim 1 wherein the fluid is a liquid or gas, with the fluid in each section being a liquid or gas and being selected and confined to each of said bearing sections to optimize the stiffness of the overall bearing.

6. A hydrodynamic bearing as claimed in claim 1 wherein said bearing include journal bearings at either end of said shaft and said sleeve filled with said higher viscosity fluid.

7. A hydrodynamic bearing comprising a shaft, a sleeve surrounding the shaft, a gap between said shaft and said sleeve allowing for relative rotation of said shaft in said sleeve and being effectively divided into a plurality of sections, and fluid means filling each of said sections to support relative rotation of said shaft and said sleeve while optimizing the power consumption and/or the stiffness of the overall bearing.

8. A hydrodynamic bearing as claimed in claim 7 wherein said gap sections include at least a first section adjacent an end of said gap and a second section interior to said gap spaced by a first section from said open end, said fluid means comprising bearing fluid in said first gap of higher viscosity than fluid in said second gap.

* * * * *